No. 875,538. PATENTED DEC. 31, 1907.
H. LENTZ & C. BELLENS.
VALVE GEAR.
APPLICATION FILED APR. 28, 1906.

WITNESSES
W. M. Avery
Chas R Wrigh

INVENTORS
Hugo Lentz
Charles Bellens
BY Munn & Co
ATTORNEYS

UNITED STATES PATENT OFFICE.

HUGO LENTZ, OF HALENSEE, NEAR BERLIN, GERMANY, AND CHARLES BELLENS, OF NEUILLY-SUR-SEINE, FRANCE.

VALVE-GEAR.

No. 875,538.　　　　Specification of Letters Patent.　　　Patented Dec. 31, 1907.

Application filed April 28, 1906. Serial No. 314,123.

*To all whom it may concern:*

Be it known that we, HUGO LENTZ, a subject of the German Empire, and resident of 123 Kurfürstendamm, Halensee, near Berlin, in the Empire of Germany, engineer, and CHARLES BELLENS, a subject of the Kingdom of Great Britian, residing 43 Rue de Chézy, Neuilly-sur-Seine, in the Republic of France, have invented certain new and useful Improvements in and Relating to Valve-Gears, of which the following is a specification.

This invention has for its object means for the operation of distributing valves, such that the corresponding cylinder has the admission and exhaust valves actuated by a shaft, bar or elongated pin forming a kind of cam shaft with channels profiled normally to the longitudinal axis, a movement of continuous or alternating rotation being imparted to this shaft.

Figure 1:
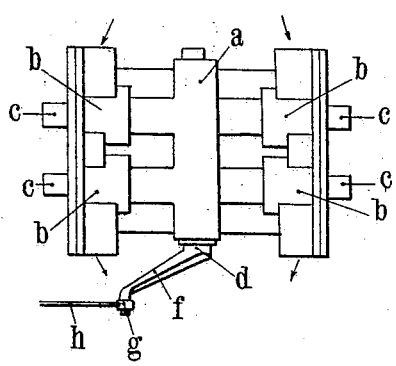
Figure 3:
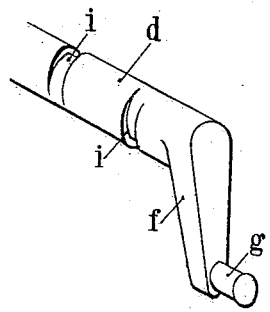
Figure 2:
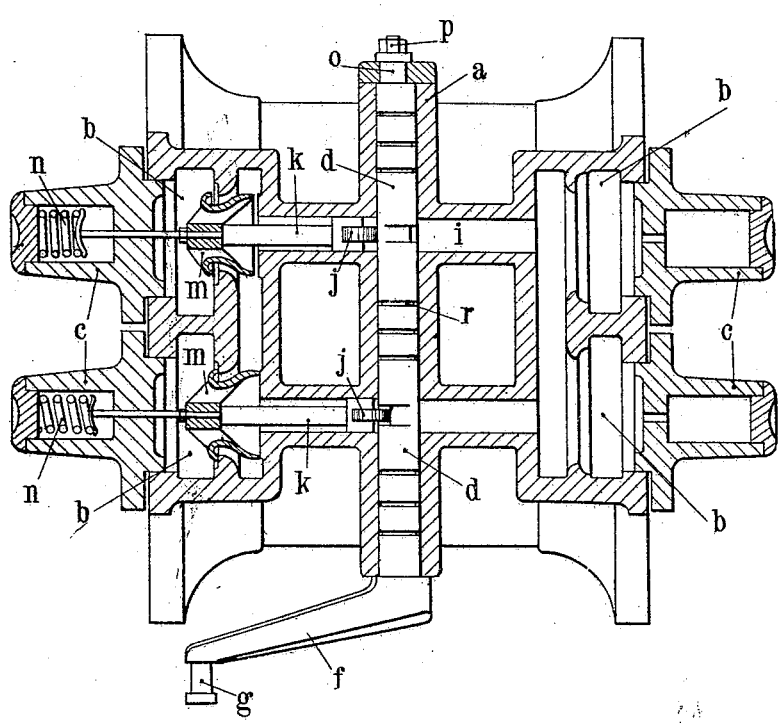

In the accompanying drawing, which shows by way of example a constructional form of the object of the invention, applied to a steam cylinder with four valve members. Figure 1 is an outside view of the cylinder and of its valve gear. Fig. 2 is a cross-section through the valve gear on the axis of the distributing shaft. Fig. 3 is a detail of the cam shaft in the constructional form represented in Fig. 1.

The body of the valve casing comprises a passage $a$ lateral to the cylinder and perpendicular to its axis; from this passage there are branched valve chests $b$ directed normally to the passage and arranged in pairs in alinement one with the other. These chests are closed by plugs $c$ forming a tight joint.

In the passage $a$ the distributing shaft is fitted; it is constituted by a shaft $d$, preferably of cylindrical section which carries outside the passage a crank $f$ (or a crank plate) provided with a crank pin $g$ to which the rod $h$ of the valve gear eccentric rod or other appropriate part of the machine is attached.

Where the passage $a$ and the valve chests $b$ intersect the distributing axle $d$ is provided with channels $i$ normal to the axis of the shaft; these channels are appropriately profiled and in them the rollers $j$ in which the valve rods $k$ terminate engage. These latter are shown at $m$. The valve rods are guided on the one hand by the forks of the rollers $j$, and on the other hand in the caps $c$ which close the valve chests Antagonistic springs $n$ insuring the closing of the valves.

The operation is as follows: When the eccentric rod or other appropriate part $h$ of the engine imparts a reciprocating movement (a movement of alternating rotation) to the crank $f$, the distributing shaft $d$ participates in this movement and causes the valves to act by means of the rollers bearing in the profiled channels $i$. When a roller is completely engaged in a channel, the corresponding valve is closed. When it passes on to the connecting profile between the channel and the surface of the axle, the roller opens the valve, the larger opening corresponding to the running of the roller upon the surface of the axle itself. In order to prevent end motion of the axle $d$, it is retained in the passage $a$ by a nut $p$ screwed on a threaded extremity $o$ of the rod.

The advantages of this valve gear are as follows: It is exceedingly simple in construction because it merely comprises a shaft and a crank. The fact of the shaft being provided with joint or packing grooves $r$ upon its periphery in itself insures a tight steam joint between the various passages and thus allows of the steam tight packings of the valve rods being dispensed with. The tightness of the joints of the system to steam, oil and dust is therefore perfect. The distributing shaft serves at the same time as a support for the gear directly operating the valves. It therefore fulfils of itself the functions of actuating the system, supporting it and of insuring the mutual tightness of the valves. Owing to the very small angular displacement which the shaft effects during its operation the friction is insignificant as are also the effects of inertia due to the moving masses. The regulation and placing in position of the various parts is readily effected, as is also the dismounting for inspection and repair. The casting of the cylinder is very simple and it is exceedingly easy to work. The thrust exerted by the valves upon the distributing shaft being always opposed in pairs balance each other, and the valve gear is thereby effectually relieved of all strains. In the example represented in the accompanying drawing, the valve chests are shown arranged in pairs in line one with the other and in the same plane. Obviously, however, the boxes might be arranged alternately and if desired grouped in any manner appropriate to the installations or applications. The axle may be given a movement of continuous rotation without modifying the principle of the invention. Owing to the operating crank being outside the valve chest, the invention permits of arranging the valve exceedingly close to the cylinder and to the cylinder ends and of thereby considerably diminishing the steam passages. With this valve operating gear it is likewise possible to transmit the operation simultaneously to several cylinders arranged parallelly or otherwise. In this case the axle fulfils a fourth function, namely, for the transmission of the operation.

The invention is applicable to stationary or moving steam engines; to thermal motors (internal combustion, explosion and other motors), to air compressors, to pumps and hydraulic apparatus, and generally speaking to all driving or driven apparatus whose operation is governed by means of valves, slide valves, pistons, cocks or other similar means.

Having now particularly described and ascertained the nature of our said invention and in what manner the same is to be performed, we declare that what we claim is:—

1. In a valve gear for steam engines, the combination of a rocking-shaft perpendicular to the axis of the engine cylinder, cam-shaped grooves formed in said shaft perpendicular to its axis, a hull or support for engaging the shaft tightly without any packing, said hull having a cylindrical bore for the shaft and other passages at right angles to the cylindrical bore, distributing valves lodged in the hull and having their stems in the said passages, and rollers at the end of the valve stems fitting into the cam-shaped grooves of the rocking-shaft.

2. In a valve gear for steam engines, a distributing rocking-shaft perpendicular to the axis of the engine cylinder, cam-shaped grooves in said shaft perpendicular to its axis, a casing having a cylindrical bore in which the shaft fits tightly without any packing, said casing being also provided with passages at right angles and leading to the cylindrical bore, chambered caps for the casing, springs lodged in said caps, distributing valves in the casings, each having oppositely projecting stems, one of which projects into a chamber of the cap and is resisted by a spring, and the other into a passage at right angles, and rollers on the ends of the last named stems working in the grooves of the distributing shaft.

In testimony whereof we have hereunto placed our hand and seal at Milan, Italy this twelfth day of April 1906.

HUGO LENTZ. [L. S.]
CHARLES BELLENS. [L. S.]

In the presence of—
TYLAR W. HARDY,
ERNESTO SANTI.